(12) United States Patent
Staples

(10) Patent No.: US 11,352,093 B2
(45) Date of Patent: Jun. 7, 2022

(54) BICYCLE HANDLEBAR HAVING DIFFERENT DIRECTIONAL STIFFNESSES

(71) Applicant: D3 Innovation Inc., Squamish (CA)

(72) Inventor: Jonathan Staples, Squamish (CA)

(73) Assignee: D3 Innovation Inc.

( * ) Notice: Subject to any disclaimer, the term of this patent is extended or adjusted under 35 U.S.C. 154(b) by 6 days.

(21) Appl. No.: 16/823,230

(22) Filed: Mar. 18, 2020

(65) Prior Publication Data
US 2021/0291930 A1     Sep. 23, 2021

(51) Int. Cl.
*B62K 21/14*     (2006.01)
*B62K 21/26*     (2006.01)

(52) U.S. Cl.
CPC .......... *B62K 21/145* (2013.01); *B62K 21/26* (2013.01)

(58) Field of Classification Search
CPC ...... B62K 21/145; B62K 21/26; B62K 21/14; B62K 21/12; B62K 21/22; B62K 21/16; Y10T 74/2078
See application file for complete search history.

(56) References Cited

U.S. PATENT DOCUMENTS

| | | | |
|---|---|---|---|
| 4,503,729 A * | 3/1985 | Shimano | B62K 21/12 |
| | | | 74/551.1 |
| D315,132 S | 3/1991 | Lance | |
| 5,117,708 A * | 6/1992 | Boyer | B62K 21/12 |
| | | | 74/551.1 |
| D330,738 S | 11/1992 | Lenhardt | |
| 5,165,301 A * | 11/1992 | Jeshurun | B62K 21/12 |
| | | | 280/261 |
| D337,748 S | 7/1993 | Adams | |
| D342,475 S | 12/1993 | Haro | |
| D384,925 S | 10/1997 | Pawsat et al. | |
| D387,316 S | 12/1997 | Pawsat et al. | |
| D388,848 S | 1/1998 | Sontz | |

(Continued)

FOREIGN PATENT DOCUMENTS

| | | | | |
|---|---|---|---|---|
| DE | 102007012267 A1 | * | 9/2008 | ............. B62K 21/12 |
| EP | 1880935 A2 | * | 1/2008 | ............. B62K 21/12 |

OTHER PUBLICATIONS https://www.neworldcycle.com/product/3t-sphinx-ltd-carbon-track-bar/ Mar. 17, 2020.

(Continued)

*Primary Examiner* — Daniel D Yabut
(74) *Attorney, Agent, or Firm* — Kevin Shipley; Fogler, Rubinoff LLP

(57) ABSTRACT

An elongate, tubular handlebar can include a laterally extending central mounting portion, a tubular left body section extending laterally from one side of the mounting portion a tubular right body section extending laterally from the other side of the mounting portion. The right body section may have an elongate, tubular right control portion extending laterally from an inboard end to an outboard end and configured to support a generally laterally extending grip and a right transition portion having a non-circular, transition cross-sectional shape at a first location defining a first width measured in a first direction and a second width that is greater than the first width and is measured in a second direction. Whereby right body section has a first stiffness in the first direction and a second stiffness that is greater than the first stiffness in the second direction.

18 Claims, 6 Drawing Sheets

(56) References Cited

U.S. PATENT DOCUMENTS

| | | | |
|---|---|---|---|
| 5,832,785 A * | 11/1998 | Costahaude | B62K 21/12 |
| | | | 74/551.1 |
| 5,950,497 A * | 9/1999 | Weiher | B62K 21/12 |
| | | | 74/551.1 |
| D415,084 S | 10/1999 | Clarkson | |
| D425,463 S | 5/2000 | Clarkson | |
| 6,122,991 A | 9/2000 | Clarkson | |
| D436,564 S | 1/2001 | Renshaw | |
| D487,416 S | 3/2004 | Lin | |
| D496,893 S | 10/2004 | Sieve et al. | |
| D499,055 S * | 11/2004 | Chiang | D12/178 |
| D612,307 S | 3/2010 | Lujan | |
| D624,858 S | 10/2010 | Carlini | |
| D682,756 S | 5/2013 | LaPorte | |
| D687,358 S | 8/2013 | Chiang | |
| D725,455 S | 3/2015 | Carlini | |
| D727,132 S | 4/2015 | D'Aluisio | |
| D777,625 S | 1/2017 | Chang | |
| D785,516 S | 5/2017 | Stockton | |
| D815,575 S | 4/2018 | Temmerman | |
| D830,926 S | 10/2018 | Eade | |
| 2005/0257640 A1 * | 11/2005 | Addink | B62K 19/16 |
| | | | 74/551.1 |
| 2007/0151403 A1 * | 7/2007 | Andrews | B62K 21/125 |
| | | | 74/551.1 |
| 2010/0018341 A1 | 1/2010 | Greppi | |
| 2010/0186542 A1 * | 7/2010 | Hashimoto | B62K 21/12 |
| | | | 74/551.1 |
| 2015/0135891 A1 * | 5/2015 | Bochereau | B62K 21/12 |
| | | | 74/551.9 |

OTHER PUBLICATIONS https://www.racersportif.com/products/look-aero-carbon-track-bar Mar. 17, 2020.

https://www.racersportif.com/products/real-speed-carbon-track-bar Mar. 17, 2020.

* cited by examiner

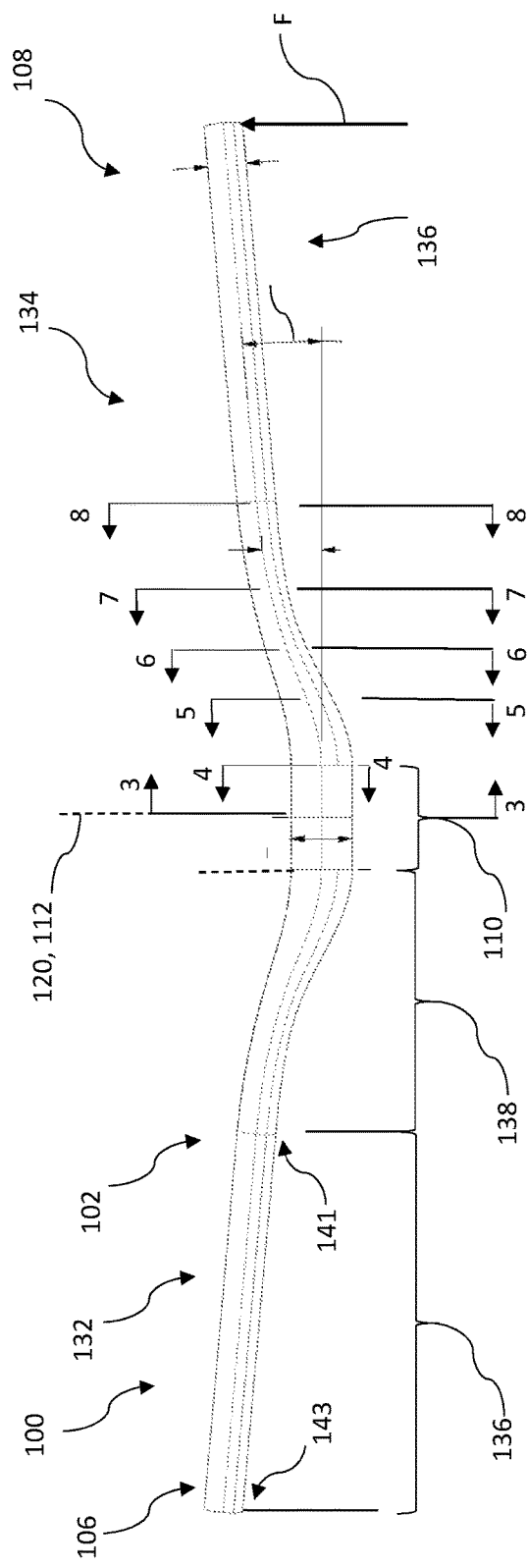
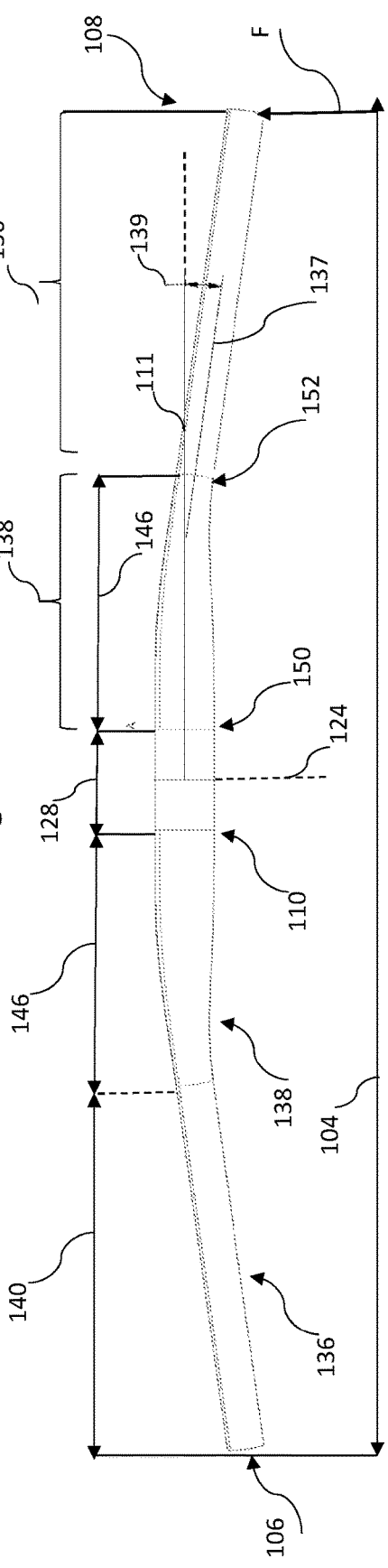
Figure 1
Figure 2

BICYCLE HANDLEBAR HAVING DIFFERENT DIRECTIONAL STIFFNESSES

FIELD OF THE INVENTION

In one of its aspects, the present disclosure relates to a handlebar for a bicycle, and in particular a handlebar configured to have different flexural rigidities (e.g. bending stiffnesses) when subjected to a given force in different directions.

INTRODUCTION

U.S. Pat. No. 6,983,949 discloses a bicycle headset structure that is provided to aid in concealment of wiring from components mounted in the handlebar area to components mounted on the rest of the bicycle. The bicycle headset structure basically comprises a handlebar attachment member and a tubular spacer member. The handlebar attachment member has wiring passage extends between the handlebar mounting portion and the steerer tube attachment portion. The tubular spacer member has a wiring channel extending between first and second ends of the tubular spacer member and an axial passageway extending axially between the upper and lower end openings of the tubular spacer member. The axial passageway is dimensioned to receive the bicycle steerer tube. The wiring channel is arranged to communicate with the wiring passage of handlebar attachment member when the handlebar attachment member and the tubular spacer member are attached to the bicycle steerer tube.

US patent publication no. 2006/0169094 discloses a handlebar that includes a handlebar main body, a pair of support walls, a first slit, and a brake lever. The handlebar main body is hollow and is mounted to the handlebar stem. The hollow interior of the handlebar main body is formed with the support walls that extend along at least a portion of the length of the interior of the handlebar main body. The brake lever has a lever body and a brake cable attachment portion. The lever body is pivotally supported by the support walls proximate the first slit. The lever body includes a brake operating portion that extends away from the handlebar main body and a pivot support portion that is pivotally mounted to the support walls.

U.S. Pat. No. 4,750,754 discloses handlebars that include a crosspiece connected to a bicycle steerer tube, and first handles are connected to the crosspiece. Novel second handles extend forwardly from the crosspiece; these second handles are located so that, when they are grasped by a rider, the rider's forearms are located to be supported by the handlebars at positions over the crosspiece. The second handles are located relatively close together to encourage the rider to adopt a riding position in which the frontal area of the rider's silhouette is minimized, and in which the rider's elbows are located ahead of the rider's lungs.

SUMMARY

In accordance with one embodiments of the teachings described herein an elongate, tubular handlebar may include a laterally extending central mounting portion configured to be connected to the steerer tube of a bicycle and extending along a control axis. A tubular left body section may extend laterally from one side of the mounting portion and may include a left control portion configured to support a grip and a left transition portion extending laterally between the left control portion and the mounting portion. A tubular right body section may extend laterally from the other side of the mounting portion and may include an elongate, tubular right control portion extending laterally from an inboard end to an outboard end and configured to support a generally laterally extending grip. A right transition portion may extend laterally between the inboard end of the right control portion and the mounting portion and may have a non-circular, transition cross-sectional shape at a first location defining a first width measured in a first direction extending in a plane that is orthogonal to the mounting axis and a second width that is greater than the first width and is measured in a second direction that is measured in the plane and that is at an angle relative to the first direction. When an input force is applied to the right control portion in the first direction the right body section may have a first stiffness and when the input force is applied to the right control portion in the second direction the right body section may have a second stiffness that is greater than the first stiffness.

The mounting portion may have a substantially circular cross-sectional shape with a mounting diameter and the right control portion may have a substantially circular cross-sectional shape with a control diameter that is less than the mounting diameter. The first width and the second width may each be greater than the control diameter and less than the mounting diameter.

The right transition portion further may include a second non-circular, transition cross-sectional shape at a second location that is laterally spaced apart from the first location and that defines a third width measured in the first direction that is less than the first width and a fourth width measured in the second direction that is less than the third width and the second width.

The third width and the second width may each be greater than the control diameter and less than the mounting diameter.

The right transition portion may have an inboard end adjacent the mounting portion and an outboard end adjacent the right control portion and wherein the first location is disposed substantially equally between the inboard end and the outboard end.

The right transition zone may have a first wall thickness at the inboard end and greater second wall thickness at the outboard end.

The right transition portion may have a substantially circular cross-sectional shape at the inboard end and at the outboard end.

The second direction may be substantially orthogonal to the first direction.

The right transition portion may be configured so that when the mounting portion is connected to the steerer tube of a bicycle the first direction is oriented within about 45 degrees of an axis of rotation of the steerer tube.

The right transition portion may be configured so that when the mounting portion is connected to the steerer tube of a bicycle the first direction is oriented within about 30 degrees of a vertical plane.

The right transition portion may be configured so that when the mounting portion is connected to the steerer tube of a bicycle the second direction is within about 45 degrees of a horizontal plane.

The right transition portion may be configured so that when the mounting portion is connected to the steerer tube of a bicycle the second direction is within about 10 degrees of a horizontal plane The second stiffness may be between about 110% and 150% of the first stiffness.

The first stiffness may be between about 5.5 and about 7.5 (kg/mm) and the second stiffness may be between about 8 and about 10 (kg/mm).

The first width may be between about 15 mm and about 30 mm.

The second width may be between about 25 mm and about 35 mm.

The first width may be between about 60% and about 90% of the second width.

The right transition portion may have a substantially elliptical transition cross-sectional shape at the first location and has an eccentricity calculated as $$\sqrt{1-\left(\frac{\text{first width}}{\text{second width}}\right)^2}$$

that is between about 0.5 and about 0.8 at the first location.

The right transition portion may be formed from at least one of a composite material and aluminium.

The handlebar may be of integral, one-piece construction.

The left transition portion may have a third non-circular, transition cross-sectional shape at a third location defining a fifth maximum width measured in the first direction and a sixth width that is less than the fifth width and is measured in the second direction. When an input force is applied to the left control portion in the first direction the left body section may have a third stiffness and when the input force is applied to the left control portion in the second direction the left body section may have a fourth stiffness that is greater than the third stiffness.

A distance between outboard ends of the left and right outboard portions in the lateral transverse direction may define a handlebar length that may be between about 700 mm and about 900 mm.

The right transition portion may have a transition length in the transverse direction that is between about 15% and about 25% of the handlebar width.

The cross-sectional shape of the right transition portion may vary along its transition length.

The right control portion may have a control length in the transverse direction that is greater than the transition length.

The right control portion may extend along a right control axis that intersects the control axis at a sweep angle that is between about 0 and about 15 degrees.

Other advantages of the invention will become apparent to those of skill in the art upon reviewing the present specification.

BRIEF DESCRIPTION OF THE DRAWINGS

Embodiments of the present invention will be described with reference to the accompanying drawings, wherein like reference numerals denote like parts, and in which:

FIG. 1 is back view of one example of a handlebar;
FIG. 2 is a top view of the handlebar of FIG. 1.

DETAILED DESCRIPTION

Figure 3:
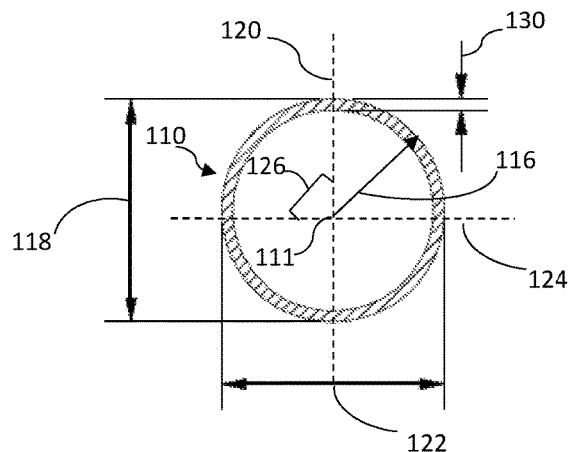
FIG. 3 is a cross-sectional view taken along line 3-3.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

The handlebars of a bicycle generally serve as a point of engagement/contact between the bicycle rider/user and the bicycle itself (e.g. in addition to the seat and pedals). The handlebars are usually connected to the steering tube of the bicycle and can be used to transmit steering forces from the user to the bicycle, thereby turning the bicycle's front wheel. The handlebar can also transmit vibrations and other forces to the rider then the bicycle is in use. For example, when a bicycle is travelling over relatively rough ground (such as when being ridden off-road) the impacts and bumps experienced by the front tire of the bicycle as it traverses over bumps, rocks, roots and other obstacles can be transmitted via the handlebar to the hands and arms of the rider. These forces and vibrations may be unpleasant for the rider and/or may contribute to rider fatigue or injury. While some of the impacts from the front wheel can be mitigated by using shocks or other suspension components in the front forks of the bicycle, the rider may still experience shocks and vibrations via the handlebar.

In general, the steering forces exerted on the handlebar to help steer the bicycle are applied in one direction (e.g. to help rotate the steering tube about its rotation axis) whereas the impact forces and vibrations may tend to be applied in a different direction than the steering forces. A mountain bike, for example, it may be configured such that the steering forces are applied in a plane that is generally orthogonal to the steering axis of the bike—and that is generally in the forward/backward direction of the bicycle. In some configurations, the steering axis may be within about 0-45 degrees of a vertical direction (and possibly between about 10 and about 30 degrees) when the bicycle is in use and therefore the plane in which the steering forces are acting may be inclined within about 0-45 degrees from the vertical direction when the bicycle is in use.

In contrast to the steering forces, the bumps and vibration forces may tend to be transferred to the rider in a variety of different directions (based on the direction of impacts acting on the front wheel) but may tend to be in what can be considered a generally up/down direction when the bicycle is in use, or optionally at an inclination of between about 0-45 (and optionally between about 10 and about 30 degrees) from a vertical axis and/or from the steering tube axis when the handlebar and bicycle are in use.

Reducing the stiffness or flexural rigidity of the handlebar may help make the handlebar more compliant/deformable when in use and may help increase the amount of elastic flexing of the handlebar while in use. As the handlebar flexes it can absorb at least some of the vibration energy and can help reduce at least the magnitude of the forces that are eventually transmitted to the hands and arms of the rider. However, if a handlebar is too flexible or compliant it may become less effective at transferring steering forces to the steering tube which may affect the steering feel and performance of the bicycle. A less stiff handlebar may also be more prone to plastic deformation and/or bending when in use and subjected to relatively high forces/loads.

Therefore, it may be desirable to provide a handlebar that can help reduce the transmission of forces/vibrations in one direction to help improve rider comfort while still being sufficiently strong and/or stiff in another direction(s) to provide a desired amount of strength and/or performance. For example, to help reduce the vibrations experienced by the rider, while still providing a desired degree of stiffness to transmit steering forces the exemplary handlebars described herein are configured to have one stiffness or flexural rigidity in the steering direction and a different, generally lower stiffness or flexural rigidity in the rider impact (e.g. generally up/down) direction. Such handlebars can be relatively more flexible in the up/down direction to help reduce the transfer of shocks and vibrations to the rider while riding.

To help reduce the amount of force transferred to the rider via the handlebar the teachings described herein relate generally to a new handlebar that can be less stiff in direction(s) that transfer force to the rider's hands and arms while still being sufficiently stiff in other directions to function as intended, including specifically being sufficiently stiff in the steering direction. To help facilitate this combination of different bending stiffnesses the handlebars described herein are configured such that their cross-sectional shape (e.g. a shape taken in a plane that is generally orthogonal to the elongate direction of the handlebar or at least the local section thereof) is different at different locations along the handlebar. When a handlebar is configured as a generally elongate, tubular object changing its cross-sectional shape can change its local mechanical properties, including its area moment of inertial which can change its bending stiffness/flexural rigidity. If the cross-sectional area of the handle bar is different at different locations along its length, the handlebar may have different stiffnesses at such locations. In addition, the handlebars described herein are configured such that the cross-sectional shape in at least some locations along the handlebar are non-circular and are configured so that the handlebar has different widths in at least two different directions. If a given input force is applied in a direction in which the handlebar width is relatively small, the handlebar may tend to have a relatively low stiffness in that direction and may tend to bend/deflect in response to the force. In contrast, if the same input force is applied in the direction in which the handlebar width is relatively large the handlebar may tend to have a relatively high stiffness in that direction and may tend not to be bend/deflect in response to the force or may bend/deflect in this direction less than it did in the direction with the relatively small width. Configuring the handlebar with cross-sectional shapes of this manner may help provide at least a portion of the handlebar that will have different stiffnesses in different directions. The cross-sectional shape defined by the handlebar may be any suitable shape that has at least two different widths (measured in different directions), including oval, rectangular, other arcuate and curved shapes, hexagonal and other polygonal shapes and the like if they are configured to provide different widths.

Referring to FIG. 1, one example of a handlebar 100 for a bicycle is illustrated. The handlebar 100 has, in this example, an elongate and generally tubular body 102 that is configured to be connected to the steerer tube of a bicycle. Referring also to FIG. 2, for the purposes discussion herein, the handlebar 100 can be considered to have a length 104 that is measured in a transverse direction between what would be the laterally spaced apart ends 106 and 108 when the handlebar 100 is mounted to the bicycle. In the configuration illustrated, the end 106 may be considered to be left end and end 108 may be considered to be the right end of the handlebar 100. The length 104 separating the ends may be any suitable length, and may be selected based on the expected use of the handlebar 100. For example, the length 104 may be between about 600 mm and about 1000 mm, and may preferably be between about 700 mm and about 900 m and in this illustrated example may be about 800 mm. This handlebar 100 may be suitable for use with a mountain bike, and in particular a mountain bike configured for downhill riding.

Figure 9:
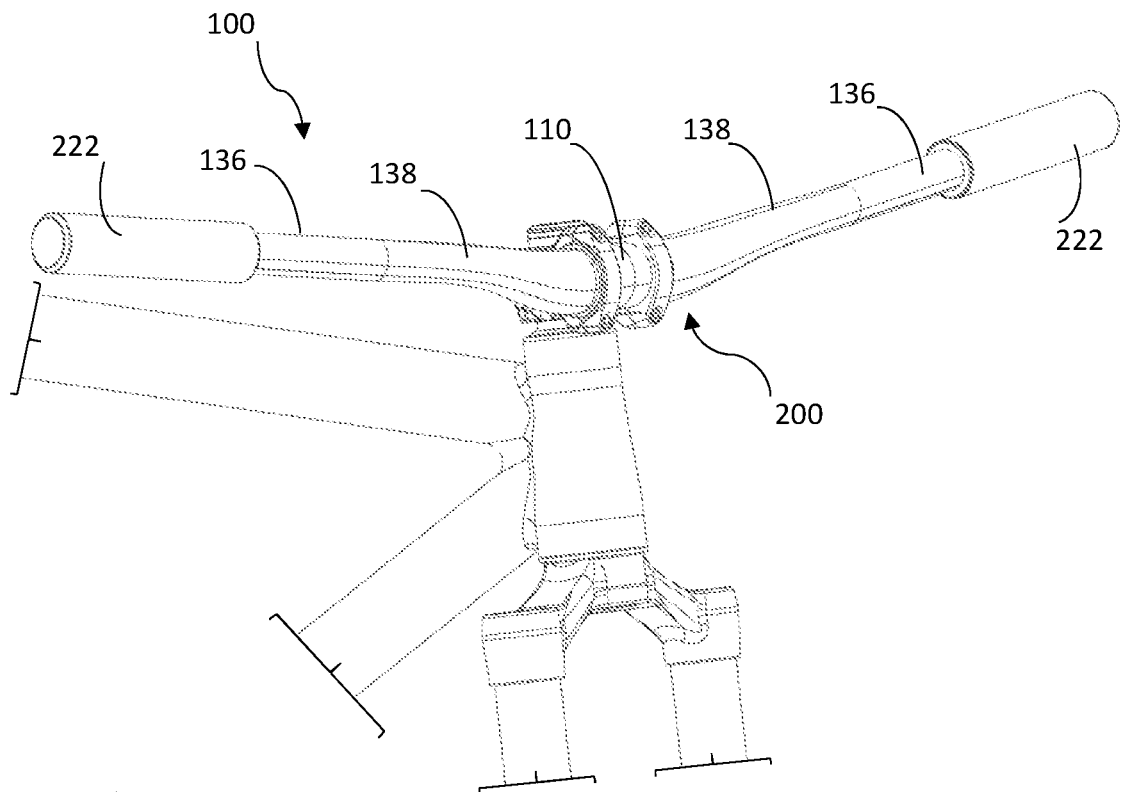
FIG. 9 is a front perspective view of the handlebar of FIG. 1 connected to a bicycle.
Figure 10:
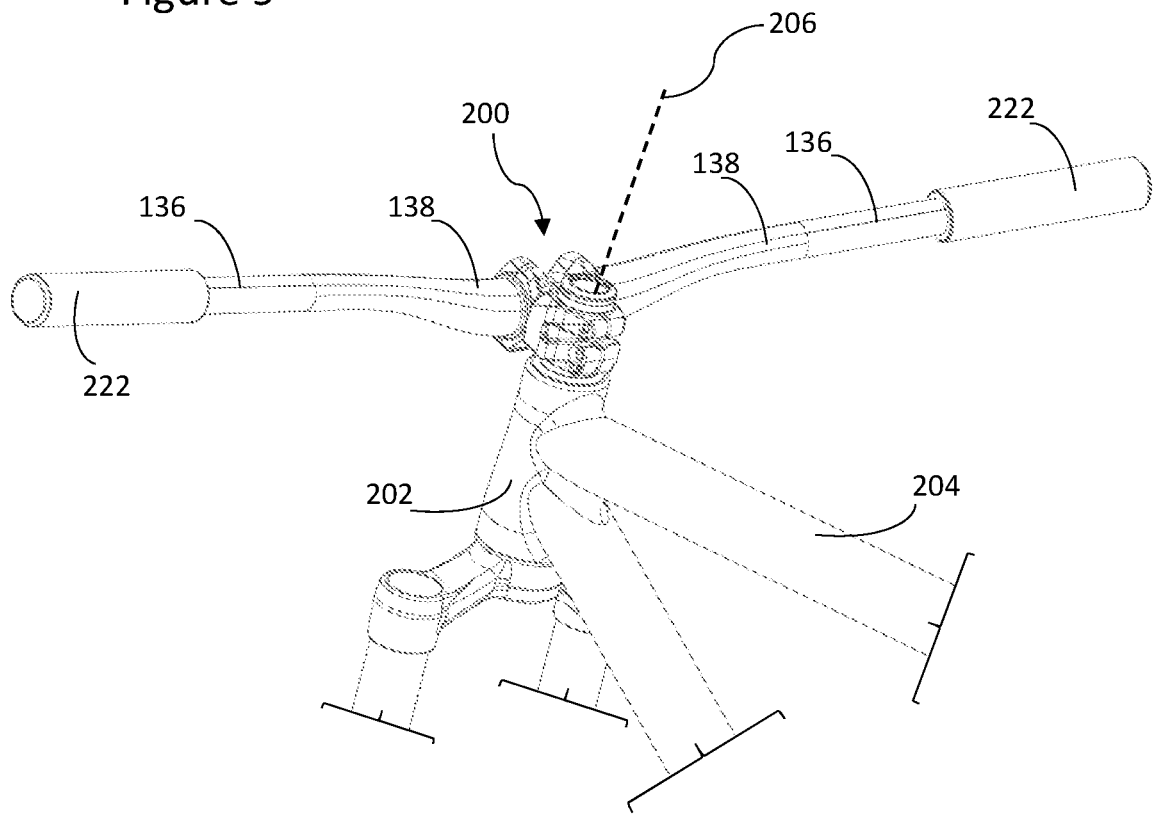
FIG. 10 is a rear perspective view of the handlebar of FIG. 1 connected to a bicycle.
Figure 11:
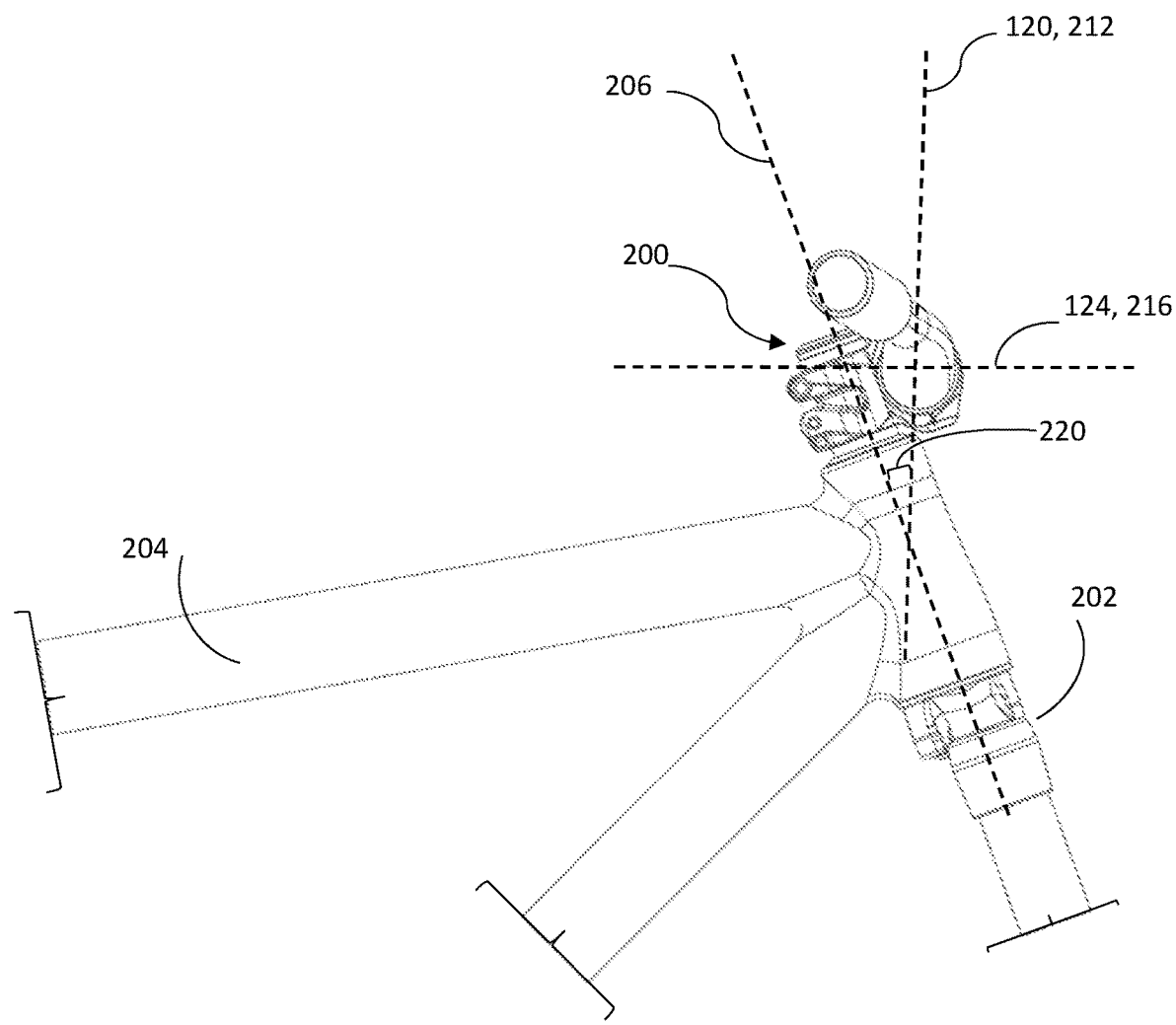
FIG. 11 is a side view of the handlebar of FIG. 1 connected to a bicycle and in a first position.

Referring also to FIGS. 9-11, in this example the handlebar 100 includes a mounting portion 110 that is shaped to be generally complimentary to an attachment portion such as a stem 200 that is mounted to an upper end of the steerer tube 202 on a bicycle 204. The steerer tube 202 can be supported on bearings and can pivot relative to the head tube of the bicycle frame about a pivot or steering axis 206 to facilitate steering of the bicycle. This mounting portion 110 may be located in any suitable location, but in most embodiments of the handlebar 100 the mounting portion 110 will be positioned in the centre of the handlebar 100 so that the handlebar 100 is generally symmetrical when mounted to the bicycle. The size and shape of the mounting portion 110 can be selected to match a given bicycle. In this example, the mounting portion 110 extends along a mounting axis 111 that is aligned with the lateral direction of the handlebar 100 in which the length 104 is measured (FIG. 2) and has a generally circular cross-sectional shape that is taken in a plane 112 that is generally orthogonal to transverse direction and axis 111.

More detail of the cross-sectional shape is shown in the cross-sectional view of FIG. 3. In this example, the central mounting portion 110 is formed from a circular portion of the handlebar body 102 and has a constant radius 116. In this arrangement the central mounting portion 110 has a width or mounting diameter 118 measured in a first direction 120 that is, in this example generally parallel to the plane 112 and a width 122 that is measured in a second direction 124. Because the central mounting portion 110 is circular, the widths 118 and 122 are substantially the same as each other in this example.

Preferably the direction 124 is arranged so as to be different than the first direction 120, and to be non-parallel and inclined relative the first direction 120 by an inclination angle 126 (FIG. 3). The angle 126 can be any suitable angle, and may vary based on the specific cross-sectional shape of a given embodiment of the handlebar. In the illustrated example the angle 126 is about 90 degrees and the second direction 124 is orthogonal to the first direction 120.

The first direction 120 and second direction 124 are directions of reference that are described in relation to the handlebar 100. As illustrated in FIG. 3 (and FIGS. 4-8) the first direction 120 is a generally vertical or upright direction, and may be generally vertical and/or aligned with the axis of rotation 206 of the steerer tube 202 (FIGS. 10 and 11) when the handlebar 100 is in use on a bicycle. In this configuration the second direction 124 may be substantially horizontal (e.g. at an angle 214 that is less than about 15 degrees or preferably less than about 10 degrees or about zero degrees from a horizontal plane/axis 216 as shown in FIG. 11) when the handlebar 100 is attached to a bicycle with the first direction 120 being generally vertical in this example. If, alternatively, the first direction 120 is slightly reclined from vertical by a larger angle 210, the second direction may be declined from horizontal axis 216 by an analogous angle 214. In other arrangements the angle 126 may be less than or greater than 90 degrees, and may be between about 120 degrees and about 60 degrees, or may be between about 110 and about 70 degrees, between about 100 and 80 degrees and other suitable angles.

Figure 12:
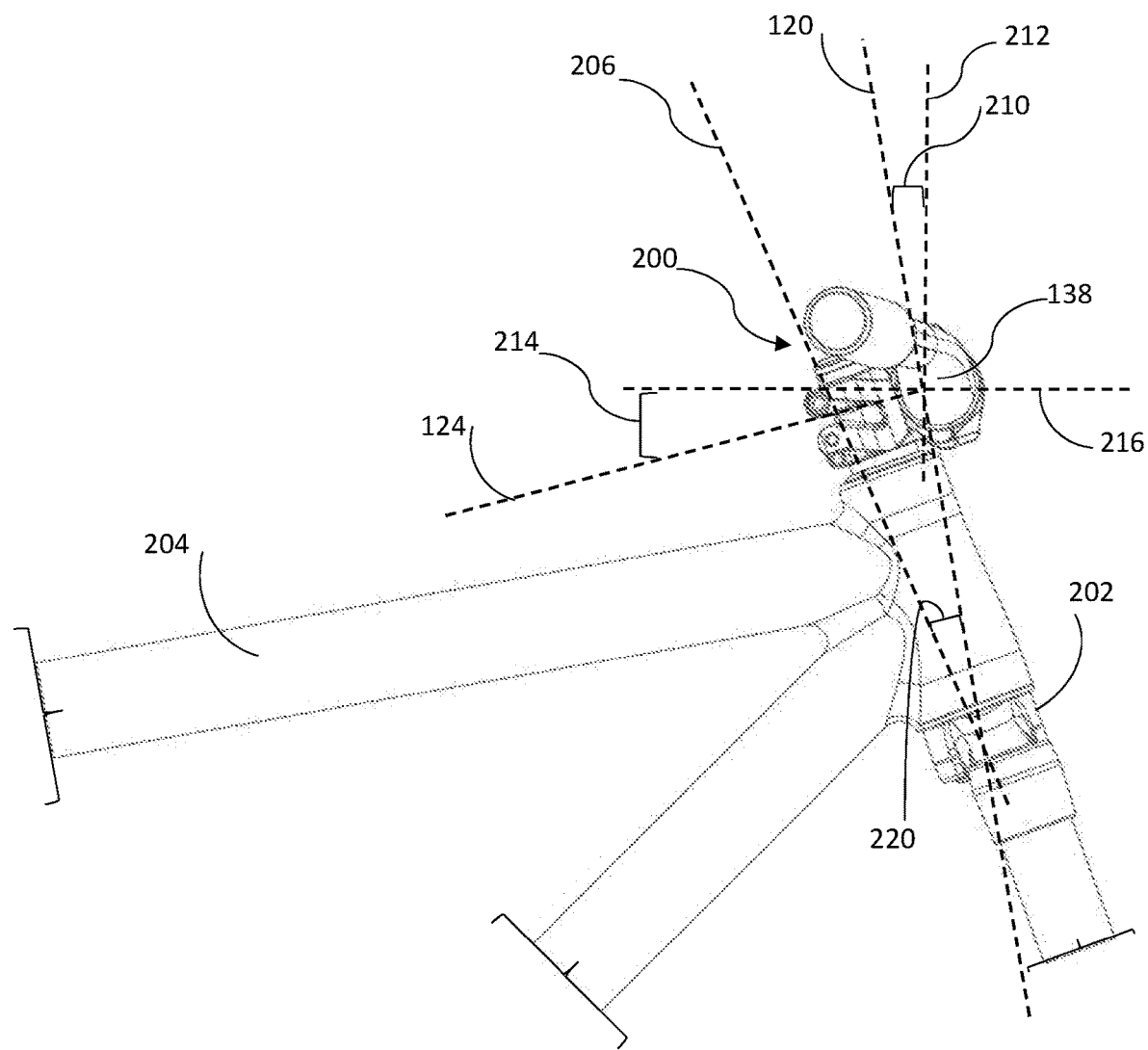
FIG. 12 is the side view of FIG. 11 with the handlebar in a different position.
Figure 13:
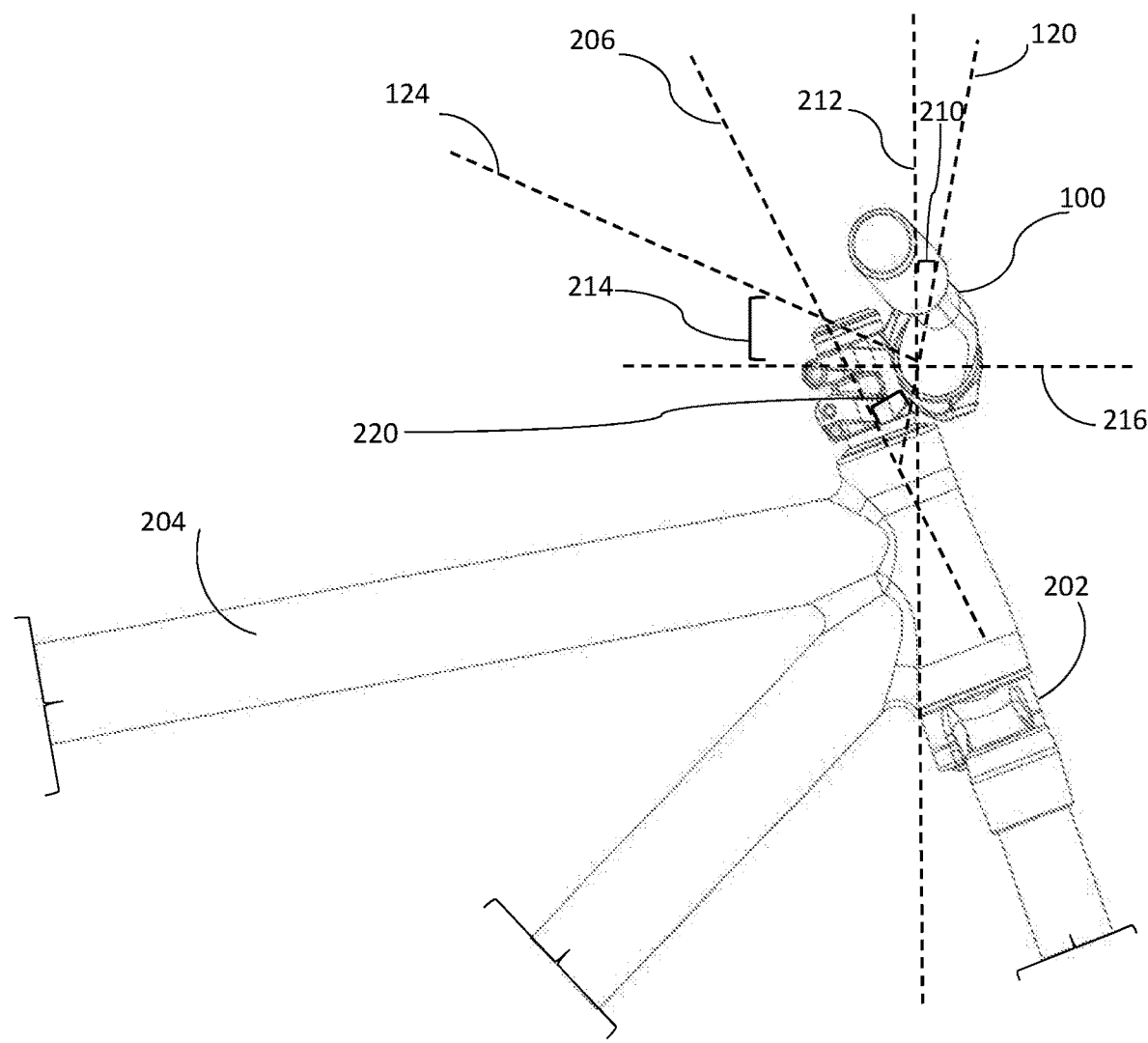
FIG. 13 is a side the side view of FIG. 11 with the handlebar in a different position.

That is, referring also to FIGS. 11-13, the handlebar 100 is preferably configured so that it can be mounted to the bicycle 204 with its first direction 120 being at an angle 210 relative to a vertical axis 212 that is within about 45 degrees (measured either forward or backwards from the axis) and may be within about 40 degrees, within about 35 degrees, within about 30 degrees, within about 25 degrees, within about 20 degrees and within about 15 degrees of the vertical axis 212. Optionally, the handlebar 100 can be configured so that when mounted to the bicycle 204 the first direction 120 is at an angle 220 that is within about 45 degrees, and may be within about 40 degrees, within about 35 degrees, within about 30 degrees, within about 25 degrees, within about 20 degrees and within about 15 degrees relative to the axis of rotation 206 of the steerer tube 204. Similarly, the second direction 124 is parallel to the horizontal axis 216 and the angle 214 is zero degrees. Alternatively the handlebar 100 may be mounted in a different rotational position relative to the steerer tube 202, and may be rotated backward such that the first direction 120 is inclined toward the rider of the bike (FIG. 12) or forward such that the first direction 120 is inclined forwardly and away from the rider of the bike (FIG. 13). Optionally, as shown in Figure lithe handlebar 100 can be mounted so that the first direction 120 is substantially vertical and is parallel with the vertical axis 212, such that the angle 210 is zero degrees. FIGS. 12 and 13 illustrate exemplary locations of the first and second directions 120 and 124 in these rotated arrangements, as well as the angles 210 and 214.

Figure 5:
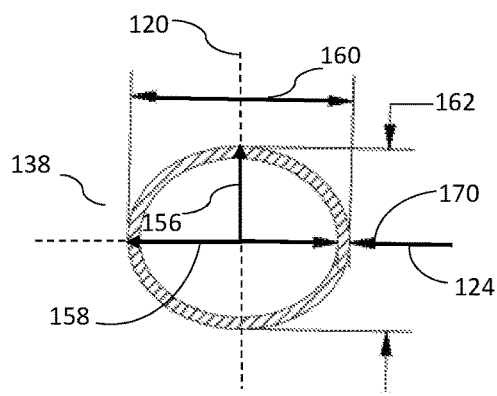
FIG. 5 is a cross-sectional view taken along line 5-5.

In the illustrated example the elliptical cross-sectional shapes in the transition portion 138 are generally symmetrical in the first and second directions 120 and 124. That is, the curvature at the left side of the shape in FIG. 5 is generally the same as the curvature on the right side of the shaped in FIG. 5, and the upper and lower sides of the shape (i.e. spaced in the first direction 120) are also the same. This can help give the handlebar 100 generally consistent mechanical properties in the first and second directions 120 and 124 when in use. This may be desirable as it may facilitate providing a similar user/rider resiliency in the first direction 120 with the flex in response to upward forces/loading being generally consistent with the flex in response to downward forces/loading. Symmetry in the second direction may help ensure that the handlebar 100 has the generally the same stiffness when responding to a right turning input as it does when responding to a left turning input from the rider, and in the illustrated example the elliptical cross-sectional shapes.

Figure 4:
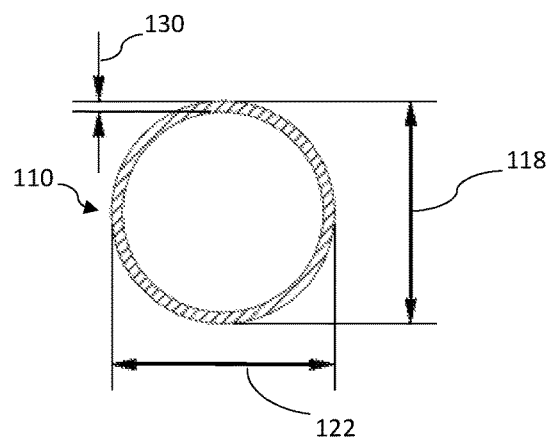
FIG. 4 is a cross-sectional view taken along line 4-4.

Preferably, the central mounting portion 110 has a constant or at least substantially constant cross-sectional shape along its length 128 in the transverse direction. This can help provide a region of generally constant shape to be received in a corresponding clamp on a steerer tube. Referring also to FIG. 4, a cross-sectional shape taken along line 4-4 at the transverse edge of the central mounting portion 110 is the same as the cross-sectional shape at plane 112, with the same widths 118 and 124. The length 128 can be any suitable length, and preferably can be selected to fit standard mounting clamps. The length 128 can be between about 50 mm and about 80 mm, and can be between about 5% and about 10% of the overall length 104. In the illustrated example the length 128 is about 60 mm.

The central mounting portion 110 also has a wall thickness that is generally constant in this illustrated example, but in other examples may have varying thicknesses around its perimeter. The wall thickness may be any suitable size, and preferably can be relatively small to help reduce the overall weight of the handlebar 100. In this example, the thickness 130 is between about 1 mm and about 2 mm.

The handlebar 100 also includes corresponding body sections that extend laterally from the sides of the central mounting portion 110. In the illustrated example, this includes a generally tubular, left body portion 132 extending from a left side of the central mounting portion 110 and a generally tubular, right body portion 134 extending from the opposite side. The left body portion 132 includes a left control portion 136 that extends from the outboard end 106 of the handlebar 100, and a left transition portion 138 that extends generally laterally between the control portion 136 and the central mounting portion 110. The right body portion 134 includes a control portion 136 that is generally the same as the control portion 136 on the left body portion 132 and a transition portion 138 that is generally the same as the left transition portion 138.

In this example, the control portions 136 are shaped to receive and support a variety of functional components, including grips 222 (FIG. 9), brakes and/or shifting equipment. Each control portion 136 is configured as a generally elongate, tubular member in this example and extends generally in the lateral/transverse direction along a respective control axis 137 (FIG. 2) between respective inboard ends 141 and outboard ends 143. As shown in this example, the control axis 137 is linear and the control portions 136 are each straight/linear, or at least substantially linear, tubular sections. Alternatively, the control axis 137 need not be linear.

The control axis 137 may be parallel or at least substantially parallel to the mounting axis 111, or alternatively may be arranged at a sweep angle 139 relative to the mounting axis 111 as shown in FIG. 2. The sweep angle 139 may be any suitable angle including about 0 degrees (i.e. the axes 111 and 139 are substantially parallel) and between about 0 degrees and about 15 degrees or more, or may be between about 5 degrees and about 10 degrees in some examples. In these configurations the control portions 136, and grips 222 thereon (FIG. 9) can be considered to be extending in the lateral/transverse direction (i.e. the direction in which width 104 is measured) even though they also have a limited degree of travel/extend in the front/back direction because of the sweep angle 139. This may be in contrast to other handle bar styles in which the control portions and/or grips are arranged in a substantially forward/backward configuration and/or are substantially orthogonal to the mounting axis 111. In this arrangement, each control portion 136 extends in the transverse direction by a respective transverse length 140 that can be selected to accommodate a desired arrangement of components.

Figure 8:
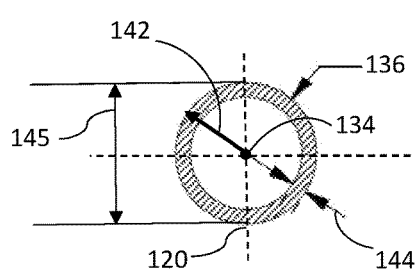
FIG. 8 is a cross-sectional view taken along line 8-8.

The control portion 136 is also configured to have a generally circular cross-sectional shape as shown in the cross-sectional view in FIG. 8, taken along line 8-8. This shape can be selected to help the handlebar 100 accommodate grips (see grips 222 in FIGS. 9-10) and other components that have an industry standard, generally round cross-sectional shape. The radius 142 is generally constant and can be sized based on industry standards and/or to help be comfortably gripped by a rider. The resulting width or control diameter 145 of the control portion 136 may be between about 15 mm and about 30 mm, and in this example is about 22 mm. The control diameter 145 is preferably less than the mounting diameter 118. The wall thickness 144 of this section can be selected to provide desired mechanical characteristics, and can be between about 1 mm and about 3 mm (or other suitable thicknesses).

While the central mounting portion 110 and the outboard control portions 136 can have generally circular and substantially constant cross-sectional areas, the transition portions 138 can be configured to help provide the desired difference in bending stiffness for the handlebar 100. While the right transition portion 138 will be referred to in more detail below, the left transition portion 138 can have the same features. That is, these portions are generally symmetrical in the embodiment illustrated, and a description of features on one side (e.g. the right or left) also apply to the corresponding features on the other side. For example, for clarity, some of the features of these body portions are described below only once, with reference to a given body portion, but the same features can be included in the other body portion. Alternatively, it is possible that a handlebar need not be symmetrical, and features found on one side need not be provided on the other side.

Figure 6:
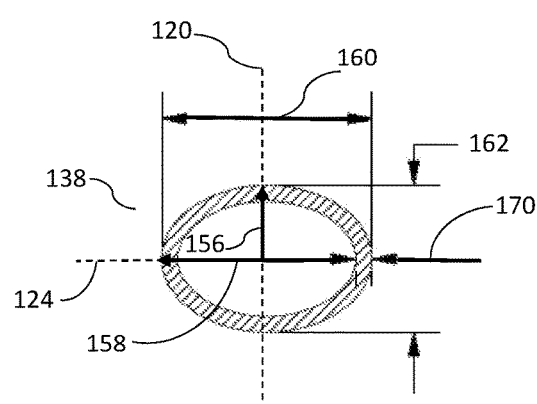
FIG. 6 is a cross-sectional view taken along line 6-6.
Figure 7:
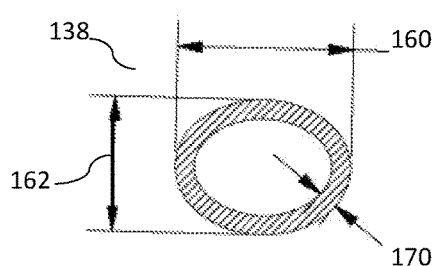
FIG. 7 is a cross-sectional view taken along line 7-7.

Referring also to FIGS. 5-7, in this example the right transition portion 138 is configured to extend between the control portion 136 and the central mounting portion 110, and has a transition length 146 in the transverse direction. In this example, the transition length 146 is greater than the central length 128 and less than the transverse control length 140. It may optionally be between about 120 mm and about 170 mm, and is about 150 mm in this example. This can be between about 15% and about 25% of the overall length 104.

Within the transition portion(s) 138 the cross-sectional shape of the handlebar can vary and at different locations along its length and at one or more location may have a non-circular cross-sectional area. For example, the transition portion 138 can have an inboard end 150 that is configured to generally match the size and shape of the central mounting portion 110, with a cross-sectional configuration that is the same as that shown in FIG. 4. Similarly, the outboard end 152 of the transition portion 138 can have a generally circular cross-sectional area that is configured to generally match the size and shape of the control portion 136, with a cross-sectional configuration that is the same as that shown in FIG. 8. Between its ends 150 and 152, the cross-sectional shape of the transition portion can vary and can be non-circular.

Referring to FIG. 5, the cross-sectional shape of the transition portion 138 taken along line 5-5 is shown. At this location, the cross-section shape is generally elliptical or oval-shaped, having a minor radius 156 measured in the first direction 120 and a longer, major radius 158 measured in the second direction 124. In this arrangement the transition portion 138 has, at this location, a width 162 in the first direction that is different from and less than the width 160 in the second direction. In this configuration the flexural rigidity/bending stiffness of the transition portion 138 will be different in the first direction 120 than it is in the second direction 124. That is, if the handlebar 100 is mounted via the central mounting portion 110 and a given input force is applied to the control portion 136 in a direction that is generally parallel to the first direction 120, as shown using arrow F in FIG. 1, the right side of the handlebar 100 will have one stiffness and will yield/bend by a certain amount. However, when an input force of the same magnitude is applied in a direction that is generally parallel to the second direction 124, as shown using arrow F in FIG. 2, the right side of the handlebar 100 will have a different stiffness that is greater than the stiffness in the second direction 124 and will yield/bend by a lesser amount in the second direction than the it deflected in the first direction 120. This may advantageously allow the handlebar 100 to be relatively more compliant in the first direction 120 (e.g. the up and down direction when riding) than it is in the second direction (e.g. the steering direction when in use). This may help provide a desired rider/user experience while still providing a desired degree of stiffness when responding to steering inputs.

Referring to also to FIGS. 6 and 7, the cross-sectional shapes of the transition portion 138 at lines 6-6 and 7-7 are shown illustrating how these cross-sectional shapes are also generally elliptical/oval-shaped but have slightly differently sized radiuses 156, 158 and widths 160, 162. This can also contribute to the different in the stiffness of the transition portion 138 in the first and second directions 120 and 124.

The widths 160 and 162 can be any suitable widths and can be between about 20 mm and about 40 mm, and may each be between about 25 mm and about 35 mm. Optionally, the handlebar 100 can be configured so that the widths 160 and 162 are each less than the width 118 of the central mounting portion 110 and greater than the width 145 of the control portions 136. For illustrative purposes, section 7-7 is taken at about the center of the transition portion 138 in the transverse direction, that is substantially equally between the inboard end 150 and the outboard end 152. Alternatively, there may be some regions in the transition portions 138 in which the width 162 is less than the width 145 of the control portion 136, and optionally where the width 160 is greater than the width 118 of the mounting portion 110.

Optionally, the transition portions 138 can be configured so that an eccentricity of their cross-sectional shapes (taken a different locations along the length 146) can range between about 0.5 and about 0.8, and may be between about 0.55 and about 0.75, where eccentricity "e" is calculated as $$e = \sqrt{1 - \left(\frac{\text{width in first direction}}{\text{width in second direction}}\right)^2}.$$

For example, Table 1 shows some examples of the widths of the illustrated cross-sectional shapes of the transition portion 138 and the corresponding eccentricity of the handlebar 100 at that location.

TABLE 1

| Location | Width (mm) in First Direction 120 | Width (mm) in Second Direction 124 | e |
|---|---|---|---|
| section 5-5 (FIG. 5) | 28.5 | 34.8 | 0.574 |
| section 6-6 (FIG. 6) | 23 | 33 | 0.717 |
| section 7-7 (FIG. 7) | 21 | 27 | 0.629 |

TABLE 1-continued

| Location | Width (mm) in First Direction 120 | Width (mm) in Second Direction 124 | e |
|---|---|---|---|
| section 4-4 (FIG. 4) | 35 | 35 | 0 |
| section 8-8 FIG. (8) | 22 | 22 | 0 |

Optionally, the transition portion can be configured so that the width 162 can be between about 15 mm and about 30 mm, and the width 160 can between about 25 mm and about 35 mm, and/or so that the width in the first direction is between about 60% and about 90% of the width in the second direction.

In this arrangement, the stiffness in the second direction 124 is greater than the stiffness in the first direction 120, and the handlebar 100 can be configured such that the second stiffness is between about 110% and about 150% or more of the first stiffness, and preferably is greater than about 120% of the first stiffness and may be greater than about 130% of the first stiffness.

The wall thickness 170 within the transition portion 138 may be any suitable thickness, and may be between about 1 mm and bout 5 mm, and preferably may be between about 1.5 mm and about 3 mm. The wall thickness 170 may remain constant along the length 146 of the transition portion 138, or as illustrated may vary along the length 146 such that a thickness 170 toward the inboard end 150 is generally less than the thickness 170 toward the outboard end 152.

In some embodiments, the handlebar 100 can be shaped and/or constructed from a suitable material (including composite materials such as carbon fibre and metals such as aluminium) so that the stiffness in the first direction is between about 5.5 (kg/mm) and about 7.5 (kg/mm) and the stiffness in the second direction is between about 8 (kg/mm) and about 10 (kg/mm).

The handlebar 100 can be formed in any suitable manner and may be formed of integral, one-piece construction. In this arrangement all of the portions 110, 136 and 138 of the bar may be formed from the same material and the differences in stiffness, etc. can be the result of the different shape of the different portions. Alternatively the handlebar may be formed from two or more pieces, optionally made from different materials.

The stiffness of a given handlebar may, for the purposes of the discussion herein, be determined using any suitable techniques, including calculations, computer modelling and/ or empirical testing or measurement. For example, one technique for determining the stiffness of the handlebar (and/or portions thereof) can include calculating the flexural rigidity of the handlebar as EI (with units Pa m$^4$), which is the product of Young's modulus (E, expressed in Pa) and the second moment of area of the handlebar (I, measured in m$^4$), as both terms can be used herein to describe the resistance offered by a structure while undergoing bending. For example, the flexural rigidity may be calculated generally as $$EI \frac{\delta y}{\delta x} = \int_0^x M(x)dx + C,$$

where y is the transverse displacement of the beam/object at location x, and M(x) is the bending moment at location x.

For a circular section of the handlebar, $$I_x = I_y = \frac{\pi}{4}r^4,$$

whereas for an oval cross-sectional having a major radius "a" in the x direction and a minor radius "b" in the y direction $$I_y = \frac{\pi}{4}b^3a \text{ and } I_x = \frac{\pi}{4}ab^3$$

Table 2 includes some empirical measurements of stiffness obtained by testing the handlebar 100 by subjecting it to loading. Handlebar 100 was mounted in a test fixture and loads were applied to both left and right control portions is a first directions and a second direction. In each load case the deflection was measured at the control area.

TABLE 2

| Description | Direction 2 Stiffness (kg/mm) | Direction 1 Stiffness (kg/mm) | Dir 2 Stiffness/ Dir 1 Stiffness |
|---|---|---|---|
| Present embodiment | 8.6 | 6.4 | 1.34 |
| Present embodiment | 9.1 | 6.8 | 1.34 |
| Present embodiment average | 8.8 | 6.6 | 1.34 |
| Competitor 1 | 5.4 | 7.2 | 0.75 |
| Competitor 2 | 6.8 | 8.9 | 0.77 |
| Competitor 3 | 6.3 | 8.9 | 0.70 |
| Competitor 6 | 6.2 | 8.4 | 0.74 |
| Competitor 7 | 6.4 | 7.9 | 0.81 |
| Competitor 8 | 6.4 | 7.6 | 0.85 |
| Competitor 9 | 6.3 | 8.0 | 0.79 |
| Competitor 10 | 6.5 | 8.9 | 0.74 |
| Competitor 11 | 9.8 | 10.1 | 0.97 |
| Competitor 12 | 10.4 | 10.8 | 0.96 |
| Competitor 13 | 6.9 | 7.3 | 0.95 |
| Competitor Average | 7.0 | 8.5 | 0.82 |

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

What is claimed is:

1. An elongate, tubular handlebar connectable to a steerer tube of a bicycle, the handlebar comprising:
    a) a laterally extending central mounting portion configured to be connected to the steerer tube of a bicycle and extending along a mounting axis;
    b) a tubular left body section extending laterally from one side of the mounting portion and comprising a left control portion configured to support a grip and a left transition portion extending laterally between the left control portion and the mounting portion;
    c) a tubular right body section extending laterally from the other side of the mounting portion and comprising:

i. an elongate, tubular right control portion extending laterally from an inboard end to an outboard end and configured to support a generally laterally extending grip; and
ii. a right transition portion extending laterally between the inboard end of the right control portion and the mounting portion and having a non-circular, transition cross-sectional shape at a first location defining a first width measured in a first direction extending in a plane that is orthogonal to the mounting axis and a second width that is greater than the first width and is measured in a second direction that is measured in the plane and that is at an angle relative to the first direction, wherein the right transition portion has a substantially elliptical transition cross-sectional shape at the first location and has an eccentricity calculated as $$\sqrt{1 - \left(\frac{\text{first width}}{\text{second width}}\right)^2}$$

that is between about 0.5 and about 0.8 at the first location; the outboard end of the right control portion is offset from the mounting axis in the first axis and the right control portion extends along a right control axis that intersects the mounting axis at a sweep angle in the second direction that is between 0 and 15 degrees whereby when an input force is applied to the right control portion in the first direction the right body section has a first stiffness and when the input force is applied to the right control portion in the second direction the right body section has a second stiffness that is between 110% and 150% of the first stiffness.

2. The handlebar of claim 1, wherein the mounting portion has a substantially circular cross-sectional shape having a mounting diameter and the right control portion has a substantially circular cross-sectional shape having a control diameter that is less than the mounting diameter, and wherein the first width and the second width are each greater than the control diameter and less than the mounting diameter.

3. The handlebar of claim 2, wherein the right transition portion further comprises a second non-circular, transition cross-sectional shape at a second location that is laterally spaced apart from the first location and that defines a third width measured in the first direction that is less than the first width and a fourth width measured in the second direction that is less than the third width and the second width.

4. The handlebar of claim 1, wherein the right transition portion has an inboard end adjacent the mounting portion and an outboard end adjacent the right control portion and wherein the first location is disposed substantially equally between the inboard end and the outboard end.

5. The handlebar of claim 4, wherein the right transition zone comprises a first wall thickness at the inboard end and greater second wall thickness at the outboard end.

6. The handlebar of claim 4, wherein the right transition portion has a substantially circular cross-sectional shape at the inboard end and at the outboard end.

7. The handlebar of claim 1, wherein the second direction is substantially orthogonal to the first direction.

8. The handlebar of claim 1, wherein the right transition portion is configured so that when the mounting portion is connected to the steerer tube of a bicycle the first direction is oriented within about 45 degrees of an axis of rotation of the steerer tube.

9. The handlebar of claim 1, wherein the right transition portion is configured so that when the mounting portion is connected to the steerer tube of a bicycle the first direction is oriented within about 30 degrees of a vertical plane.

10. The handlebar of claim 1, wherein the right transition portion is configured so that when the mounting portion is connected to the steerer tube of a bicycle the second direction is within about 45 degrees of a horizontal plane.

11. The handlebar of claim 1, wherein the first stiffness is between about 5.5 and about 7.5 (kg/mm) and the second stiffness is between about 8 and about 10 (kg/mm).

12. The handlebar of claim 1, wherein the first width is between about 15 mm and about 30 mm and wherein the second width is between about 25 mm and about 35 mm.

13. The handlebar of claim 1, wherein the first width is between about 60% and about 90% of the second width.

14. The handlebar of claim 1, wherein the left transition portion comprises a third non-circular, transition cross-sectional shape at a third location defining a fifth maximum width measured in the first direction and a sixth width that is greater than the fifth width and is measured in the second direction;
whereby when an input force is applied to the left control portion in the first direction the left body section has a third stiffness and when the input force is applied to the left control portion in the second direction the left body section has a fourth stiffness that is greater than the third stiffness.

15. The handlebar of claim 1, wherein a distance between an outboard end of the left control portion and the outboard end of the and right outboard portions control portion in the lateral transverse direction defines a handlebar length, and wherein the handlebar length is between about 700 mm and about 900 mm.

16. The handlebar of claim 15, wherein the right transition portion has a transition length in the transverse direction that is between about 15% and about 25% of the handlebar length.

17. The handlebar of claim 16, wherein the right control portion has a control length in the transverse direction that is greater than the transition length.

18. An elongate, tubular handlebar connectable to a steerer tube of a bicycle, the handlebar comprising:
a) a laterally extending central mounting portion configured to be connected to the steerer tube of a bicycle and extending along a mounting axis;
b) a tubular left body section extending laterally from one side of the mounting portion and comprising a left control portion configured to support a grip and a left transition portion extending laterally between the left control portion and the mounting portion;
c) a tubular right body section extending laterally from the other side of the mounting portion and comprising:
i. an elongate, tubular right control portion extending laterally from an inboard end to an outboard end and configured to support a generally laterally extending grip; and
ii. a right transition portion extending laterally between the inboard end of the right control portion and the mounting portion and having a non-circular, transition cross-sectional shape at a first location defining a first width measured in a first direction extending in a plane that is orthogonal to the mounting axis and a second width that is greater than the first width and is measured in a second direction that is measured in the plane and that is at an angle relative to the first direction, wherein the right transition portion has a substantially elliptical transition cross-sectional shape at the first location and has an eccentricity calculated as $$\sqrt{1-\left(\frac{\text{first width}}{\text{second width}}\right)^2}$$

that is between about 0.5 and about 0.8 at the first location; the outboard end of the right control portion is offset from the mounting axis in the first axis and the right control portion extends along a right control axis that intersects the mounting axis at a sweep angle in the second direction that is between 0 and 15 degrees whereby when an input force is applied to the right control portion in the first direction the right body section has a first stiffness and when the input force is applied to the right control portion in the second direction the right body section has a second stiffness, wherein the first stiffness is between 5.5 and 7.5 (kg/mm) and the second stiffness is between 8 and 10 (kg/mm).

* * * * *